US012447759B2

(12) United States Patent
Ishidoya et al.

(10) Patent No.: US 12,447,759 B2
(45) Date of Patent: Oct. 21, 2025

(54) PORTABLE TERMINAL, PRINTING CONTROL METHOD, AND PROGRAM

(71) Applicant: Seiko Instruments Inc., Chiba (JP)

(72) Inventors: Yohei Ishidoya, Chiba (JP); Shohei Nomura, Chiba (JP); Koki Yoshida, Chiba (JP); Soshiro Aoki, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 82 days.

(21) Appl. No.: 18/516,624

(22) Filed: Nov. 21, 2023

(65) Prior Publication Data

US 2024/0174007 A1 May 30, 2024

(30) Foreign Application Priority Data

Nov. 29, 2022 (JP) ................................ 2022-189833

(51) Int. Cl.

*B41J 11/00* (2006.01)
*B41J 2/32* (2006.01)
*B41J 3/407* (2006.01)
*B41J 11/70* (2006.01)

(52) U.S. Cl.

CPC ............... *B41J 11/009* (2013.01); *B41J 2/32* (2013.01); *B41J 3/4075* (2013.01); *B41J 11/0095* (2013.01); *B41J 11/70* (2013.01)

(58) Field of Classification Search

CPC ....... B41J 11/009; B41J 11/0095; B41J 11/70; B41J 2/32; B41J 13/00; B41J 15/00; B41J 15/02; B41J 15/044

See application file for complete search history.

(56) References Cited

U.S. PATENT DOCUMENTS 11,567,705 B2 * 1/2023 Morimoto ............. G06F 3/1204
2020/0379688 A1 * 12/2020 Sugiura ................. G06F 3/1253

FOREIGN PATENT DOCUMENTS

EP 3153321 * 4/2017 .......... B41J 11/0095
JP 2003-063693 A 3/2003

OTHER PUBLICATIONS

Extended European Search Report in Europe Application No. 23212746.4, dated Mar. 13, 2024, 5 pages.

* cited by examiner

*Primary Examiner* — Kristal Feggins
(74) *Attorney, Agent, or Firm* — Crowell & Moring LLP

(57) ABSTRACT

A portable terminal has a thermal head. The portable terminal includes a first sensor unit configured to detect presence or absence of a sheet, a second sensor unit configured to detect information related to a mark provided on the sheet, and a sheet determination unit configured to determine a kind of the sheet. The sheet determination unit is configured to determine a kind of the sheet based on a result of detecting information related to the mark with use of the second sensor unit after the sheet is conveyed in a reverse direction with respect to a direction of discharging the sheet.

9 Claims, 8 Drawing Sheets

PORTABLE TERMINAL, PRINTING CONTROL METHOD, AND PROGRAM

RELATED APPLICATIONS

This application claims priority to Japanese Patent application No. JP2022-189833 filed on Nov. 29, 2022, the entire content of which is incorporated herein by reference.

BACKGROUND OF THE INVENTION

1. Field of the Invention

The present disclosure relates to a portable terminal, a printing control method, and a program.

2. Description of the Related Art

In a thermal printer, a plurality of kinds of sheets may be used as sheets subjected to printing. Further, in a thermal printer, automatic determination of a kind of a sheet that has been set is performed.

For example, in a related art as described in Japanese Patent Application Laid-open No. 2003-63693, identification of a kind of a sheet that has been set in a printing apparatus is performed, and an operation is performed in accordance with the kind of the sheet.

In the related-art thermal printer described above, one sensor unit is provided. A sheet is conveyed in a forward direction from its leading edge by an automatic loading method, and a mark provided on the sheet is detected by the sensor unit. Based on a result of the detection, determination is made on whether the sheet is a label sheet or a plain sheet. In this case, in the thermal printer, in order to prevent wasting the first sheet, the sheet is conveyed in a reverse direction so as to return the sheet back to the leading edge thereof.

However, in such related art, a mark provided on the first sheet cannot be detected in some cases due to a positional relationship between an insertion portion of the sheet and the sensor unit. Thus, determination of a kind of a sheet through detection of a mark on the second sheet has been performed. As a result, in the related art, because a sheet corresponding to one sheet is conveyed in the forward direction and the reverse direction, a long time is required for determining a kind of the sheet.

The present disclosure has been made in view of the above-mentioned circumstances, and has an object to provide a portable terminal, a printing control method, and a program with which processing of determining a kind of a sheet that has been set can be implemented in a short period of time.

SUMMARY OF THE INVENTION

According to one embodiment of the present invention, there is provided a portable terminal having a thermal head, the portable terminal including a first sensor unit configured to detect presence or absence of a sheet, a second sensor unit configured to detect information related to a mark provided on the sheet, and a sheet determination unit configured to determine a kind of the sheet, wherein the sheet determination unit is configured to determine a kind of the sheet based on a result of detecting information related to the mark with use of the second sensor unit after the sheet is conveyed in a reverse direction with respect to a direction of discharging the sheet.

In the above-mentioned portable terminal according to the one embodiment of the present invention, wherein the portable terminal has a structure for setting the sheet by a drop-in method.

In the above-mentioned portable terminal according to the one embodiment of the present invention, the portable terminal further including a cutter unit configured to cut the sheet, wherein the first sensor unit is configured to detect the presence or absence of the sheet at one of a position of the cutter unit or a position in a periphery thereof, and wherein the cutter unit is configured to perform an operation of cutting the sheet when the sheet is present, and is configured to avoid performing the operation of cutting the sheet when the sheet is absent.

In the above-mentioned portable terminal according to the one embodiment of the present invention, wherein the presence or absence of the mark, a length of the mark, and an interval of the mark are detected with use of the second sensor unit.

In the above-mentioned portable terminal according to the one embodiment of the present invention, wherein two or more of a plain sheet having no mark provided thereon, a label sheet without a liner having the mark provided thereon, and a label sheet with a liner having the mark provided thereon are used as the sheet.

In the above-mentioned portable terminal according to the one embodiment of the present invention, the portable terminal further including a third sensor unit configured to detect information related to the mark provided on the sheet, wherein the second sensor unit and the third sensor unit are configured to detect respective pieces of information related to the marks arranged at different positions on the sheet In the above-mentioned portable terminal according to the one embodiment of the present invention, wherein a plain sheet having no mark provided thereon, a label sheet without a liner having the mark provided thereon, and a label sheet with a liner having the mark provided thereon are used as the sheet.

According to one embodiment of the present invention, there is provided a printing control method to be performed in a portable terminal having a thermal head, the printing control method including: detecting, by a first sensor unit, presence or absence of a sheet; detecting, by a second sensor unit, information related to a mark provided on the sheet; and determining, by a sheet determination unit, a kind of the sheet based on a result of detecting information related to the mark with use of the second sensor unit after the sheet is conveyed in a reverse direction with respect to a direction of discharging the sheet.

According to one embodiment of the present invention, there is provided a program for causing a computer forming a portable terminal having a thermal head to implement the functions of detecting presence or absence of a sheet based on a result of detection by a first sensor unit, detecting information related to a mark provided on the sheet based on a result of detection by a second sensor unit, and determining a kind of the sheet based on a result of detecting information related to the mark with use of the second sensor unit after the sheet is conveyed in a reverse direction with respect to a direction of discharging the sheet.

DETAILED DESCRIPTION OF THE PREFERRED EMBODIMENTS

Figure 1:
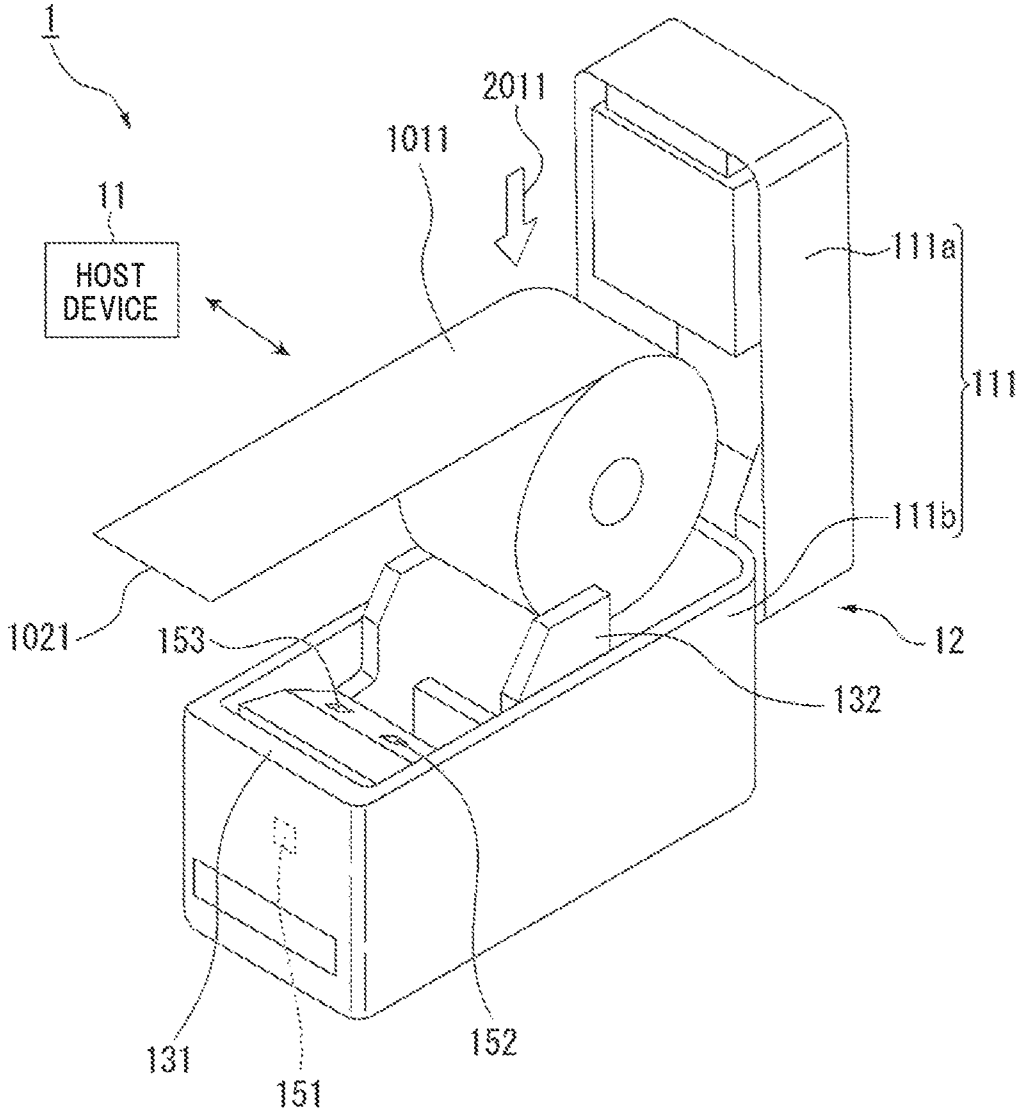
FIG. 1 is a view for illustrating an example of a schematic configuration of a printing system and an example of a schematic appearance of a thermal printer in at least one embodiment of the present disclosure.

Now, referring to the drawings, at least one embodiment of the present disclosure is described.

Printing System

FIG. 1 is a view for illustrating an example of a schematic configuration of a printing system 1 and an example of a schematic appearance of a thermal printer 12 in the at least one embodiment. The printing system 1 includes a host device 11 and a thermal printer 12. The host device 11 and the thermal printer 12 are connected to each other for communication in a wired or wireless manner. In the at least one embodiment, the thermal printer 12 is a portable terminal having a thermal head.

As the wired communication, for example, communication using Universal Serial Bus (USB) may be used. As the wireless communication, for example, communication using Wi-Fi or communication using Bluetooth™ may be used.

<Host Device>

The host device 11 is a computer, for example, a notebook computer, a laptop computer, a smartphone, or a tablet terminal.

In the at least one embodiment, the host device 11 includes a processor such as a central processing unit (CPU) and a memory such as a read-only memory (ROM) and a random access memory (RAM). In the host device 11, the processor executes a predetermined program, to thereby execute various types of processing. The program may be stored in the memory.

In the at least one embodiment, for example, the host device 11 transmits an instruction for printing to the thermal printer 12 to control printing processing performed by the thermal printer 12.

<Thermal Printer>

FIG. 1 shows an example of an appearance of the thermal printer 12. The thermal printer 12 includes a housing 111. The housing 111 includes a housing upper part 111*a* and a housing lower part 111*b*. The housing upper part 111*a* may also be referred to as, for example, a top cover.

Further, the thermal printer 12 includes a sheet discharge port 131, a pincher 132, a first sensor unit 151, a second sensor unit 152, and a third sensor unit 153. In the at least one embodiment, illustration is given of a configuration in which the first sensor unit 151, the second sensor unit 152, and the third sensor unit 153 are provided to the housing lower part 111*b*. However, the present disclosure is not necessarily limited to such configuration. For example, there may be employed a configuration in which the first sensor unit 151 is provided to the housing upper part 111*a*.

FIG. 1 shows an example of a sheet 1011 that is to be set in the thermal printer 12. Further, FIG. 1 shows a leading edge 1021 of the sheet 1011 and a direction 2011 in which the sheet 1011 is to be dropped into the housing lower part 111*b* of the thermal printer 12. The sheet 1011 may have predetermined marks provided thereon, but illustration of such marks is omitted in FIG. 1.

In the at least one embodiment, the second sensor unit 152 is movable, and can be adjusted with the pincher 132 in a width direction in accordance with a sheet width. Meanwhile, in the at least one embodiment, the third sensor unit 153 is arranged at a fixed position.

Now, description is made of an overview of an operation of the thermal printer 12 according to the at least one embodiment. In the thermal printer 12 according to the at least one embodiment, a kind of a sheet is determined from among three kinds of sheets, specifically, a plain sheet (for example, a receipt sheet), a label sheet without a liner, and a label sheet with a liner.

To set a sheet in the thermal printer 12, a user drops a roll sheet in the predetermined direction 2011, operates the pincher 132 to be adapted to a sheet width, and closes the housing upper part 111*a*. In the at least one embodiment, the time for determination can be shortened by setting the sheet such that the leading edge 1021 of the sheet is located within 50 mm from the sheet discharge port 131.

After the housing upper part 111*a* is closed, in the thermal printer 12, the presence or absence of a sheet is determined by the first sensor unit 151, and the sheet is conveyed. When it is determined that the sheet is present, in the thermal printer 12, the sheet is conveyed in a reverse direction until it is determined that the sheet is absent so that the first label or sheet can be used from its leading edge. During this operation, detection by the second sensor unit 152 or the third sensor unit 153 is not performed. Such measure is taken for the purpose of allowing the sheet to be used from its leading edge.

Next, in the thermal printer 12, a mark provided on the sheet is detected by the second sensor unit 152 or the third sensor unit 153, and a kind of the sheet is automatically determined. In the example of FIG. 1, although illustration is omitted, a label sheet without a liner has marks provided at a position corresponding to a position at which the second sensor unit 152 is arranged. Meanwhile, in the example of FIG. 1, although illustration is omitted, a label sheet with a liner has marks provided at a position corresponding to a position at which the third sensor unit 153 is arranged. Further, a plain sheet has no mark provided thereon.

In this manner, in the thermal printer 12, when the mark of the sheet has been detected by the second sensor unit 152, it can be determined that the sheet is a label sheet without a liner. When the mark of the sheet has been detected by the third sensor unit 153, it can be determined that the sheet is a label sheet with a liner. Further, in the thermal printer 12, when no mark has been detected by any one of the second sensor unit 152 or the third sensor unit 153, it can be determined that the sheet is a plain sheet. Then, in the thermal printer 12, a cutting position for the sheet that has been automatically detected and a correction amount for a printing start position are set, and the sheet is moved to the cutting position.

Figure 2:
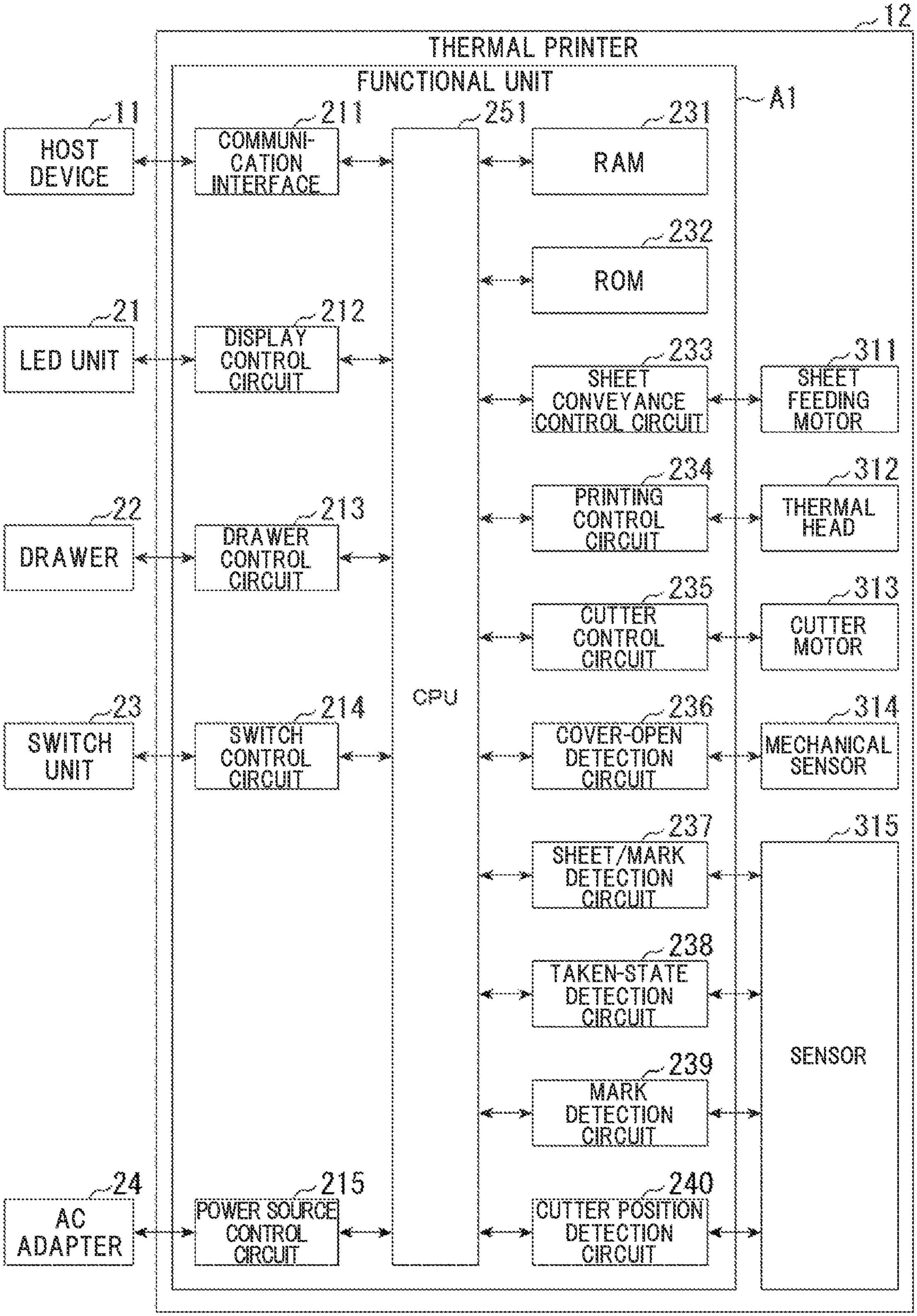
FIG. 2 is a diagram for illustrating an example of functional blocks of the thermal printer according to the at least one embodiment.

FIG. 2 is a diagram for illustrating an example of functional blocks of the thermal printer 12 according to the at least one embodiment. In the at least one embodiment, illustration is given of a case in which the thermal printer 12 is applied to a point-of-sales (POS) terminal. However, the present disclosure is not limited to such case.

FIG. 2 shows an example of functional blocks of the thermal printer 12. The thermal printer 12 includes a functional unit A1, a sheet feeding motor 311, a thermal head 312, a cutter motor 313, a mechanical sensor 314, and a sensor 315. The functional unit A1 includes a CPU 251 and peripheral functions of the CPU 251.

The functional unit A1 includes a communication interface 211, a display control circuit 212, a drawer control circuit 213, a switch control circuit 214, a power supply control circuit 215, a RAM 231, a ROM 232, a sheet conveyance control circuit 233, a printing control circuit 234, a cutter control circuit 235, a cover-open detection circuit 236, a sheet/mark detection circuit 237, a taken-state detection circuit 238, a mark detection circuit 239, and a cutter position detection circuit 240.

In the at least one embodiment, the thermal printer 12 includes a processor (the CPU 251 in the at least one embodiment) and a memory such as the ROM 232 and the RAM 231. In the thermal printer 12, the processor executes a predetermined program with use of the memory, to thereby execute various types of processing. The program may be stored in the memory. In the at least one embodiment, illustration is given of a case in which a function of a sheet determination unit that determines a kind of a sheet is implemented by functions of the CPU 251. However, as another example, the thermal printer 12 may include, separately from the CPU 251, the sheet determination unit that determines a kind of a sheet.

Further, in FIG. 2, as devices that are external to the thermal printer 12, there are provided the host device 11, a light-emitting-diode (LED) unit 21, a drawer 22, a switch unit 23, and an alternating-current (AC) adapter 24. The LED unit 21 includes LEDs and displays predetermined information through light emission or blinking of the LEDs. The drawer 22 is a cash drawer of a POS register. The switch unit 23 includes one or more switches, and receives an instruction in accordance with an operation made by a user on the switch. The switch unit 23 may include a switch that receives an instruction of, for example, feeding. The AC adapter 24 is connected to, for example, a commercial power supply, and converts alternating-current power supply from the commercial power supply into direct-current power supply.

Description is made of each functional unit of the thermal printer 12. The sheet feeding motor 311 is a motor for conveying a sheet. The thermal head 312 is a head that performs printing on a sheet by heat. The cutter motor 313 is a motor for driving a cutter. The mechanical sensor 314 detects a state of opening or closing of the housing upper part 111*a*.

The sensor 315 detects values (for example, physical quantities) for detection of information by each of the sheet/mark detection circuit 237, the taken-state detection circuit 238, the mark detection circuit 239, and the cutter position detection circuit 240. The sensor 315 includes different sensors for the sheet/mark detection circuit 237, the taken-state detection circuit 238, the mark detection circuit 239, and the cutter position detection circuit 240, respectively. A PI sensor may be used as the sensor 315.

In the at least one embodiment, the taken-state detection circuit 238 and a sensor therefor correspond to the first sensor unit 151. The mark detection circuit 239 and a sensor therefor correspond to the second sensor unit 152. The sheet/mark detection circuit 237 and a sensor therefor correspond to the third sensor unit 153.

The sheet conveyance control circuit 233 controls the sheet feeding motor 311 in accordance with an instruction from the CPU 251. The printing control circuit 234 controls the thermal head 312 in accordance with an instruction from the CPU 251. The cutter control circuit 235 controls the cutter motor 313 in accordance with an instruction from the CPU 251.

The cover-open detection circuit 236 detects a cover-open state, in which the housing upper part 111*a* is opened, based on a result of detection by the mechanical sensor 314, and notifies a result of the detection to the CPU 251. When the cover-open state is not given, the relevant state is a cover-close state in which the housing upper part 111*a* is closed. The sheet/mark detection circuit 237 detects a sheet or a mark based on a result of detection by the sensor 315, and notifies a result of the detection to the CPU 251. The taken-state detection circuit 238 detects that a sheet (for example, a sheet that has been cut) has been taken based on a result of detection by the sensor 315, and notifies a result of the detection to the CPU 251. The mark detection circuit 239 detects a mark based on a result of detection by the sensor 315, and notifies a result of the detection to the CPU 251. The cutter position detection circuit 240 detects a cutter position (position at which a sheet is cut with a cutter) based on a result of detection by the sensor 315, and notifies a result of the detection to the CPU 251.

The communication interface 211 is an interface that performs communication to and from the host device 11. The CPU 251 performs communication to and from the host device 11 via the communication interface 211. In the at least one embodiment, for example, print data or the like is transmitted from the host device 11 to the thermal printer 12.

The display control circuit 212 controls the LED unit 21 in accordance with an instruction from the CPU 251 to allow the LED unit 21 to display desired information. The drawer control circuit 213 performs control on a state of the drawer 22 (for example, control of opening the drawer 22) in accordance with an instruction from the CPU 251. The switch control circuit 214 receives an instruction corresponding to an operation performed on the switch of the switch unit 23, and notifies the instruction to the CPU 251. The power supply control circuit 215 supplies power supply input from the AC adapter 24 to the CPU 251. In the at least one embodiment, with such power supply, each functional unit of the thermal printer 12 performs an operation.

Example of Kinds of Sheets

<Plain Sheet>

A plain sheet is a sheet without a mark.

<Label Sheet without Liner>

Figure 3:
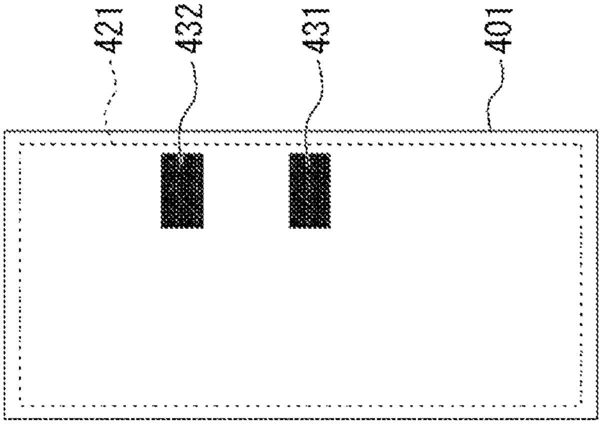
FIG. 3 is a view for illustrating an example of a schematic configuration of a label sheet without a liner in the at least one embodiment.

FIG. 3 is a view for illustrating an example of a schematic configuration of a label sheet 401 without a liner in the at least one embodiment. FIG. 3 shows a printing region 421 and marks 431 and 432. The printing region 421 is set on an inner side of the label sheet 401 without a liner. The marks 431 and 432 are provided on the label sheet 401 without a liner. In the example of FIG. 3, the marks 431 and 432 are provided on a right side with respect to a center of the illustrated label sheet 401 without a liner and at predetermined intervals in an up-and-down direction. The plurality of marks may be provided, for example, at fixed intervals over the entirety of one roll. The example of FIG. 3 is schematic, and a shape of the marks, positions of the marks, an interval of the marks, and the like are not limited to those of this example.

<Label Sheet with Liner>

Figure 4:
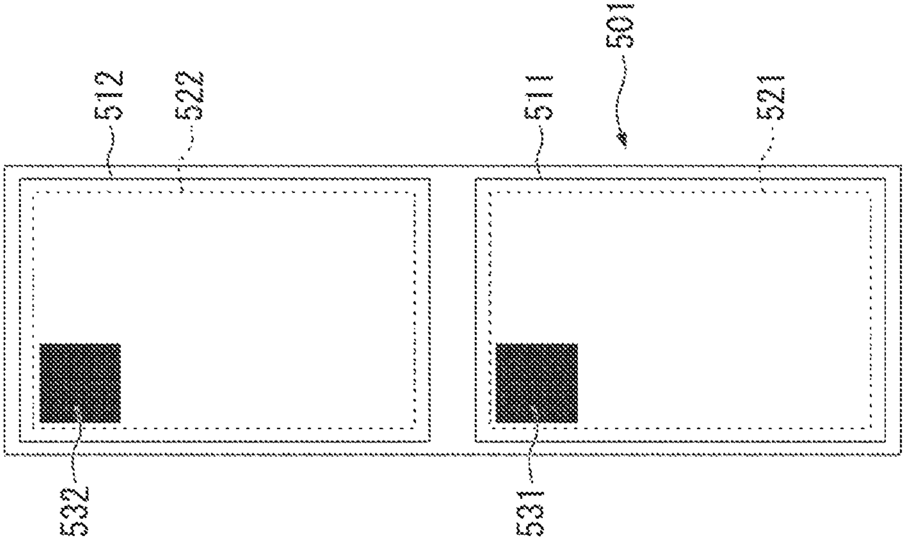
FIG. 4 is a view for illustrating an example of a schematic configuration of a label sheet with a liner in the at least one embodiment.

FIG. 4 is a view for illustrating an example of a schematic configuration of a label sheet 501 with a liner in the at least one embodiment. FIG. 4 shows liners 511 and 512, printing regions 521 and 522, and marks 531 and 532. The liners 511 and 512 are provided at predetermined intervals on the label sheet 501 with a liner. The printing regions 521 and 522 are set on an inner side of the liners 511 and 512, respectively. The marks 531 and 532 are provided at corresponding locations on the liners 511 and 512 of the label sheet 501 with a liner. The plurality of marks may be provided, for example, at fixed intervals over the entirety of one roll. In the example of FIG. 4, the marks 531 and 532 are provided on a left side with respect to a center of the illustrated label sheet 501 with a liner and at predetermined intervals in an up-and-down direction. The example of FIG. 4 is schematic, and a shape of the liners, an interval of the liners, a shape of the marks, positions of the marks, an interval of the marks, and the like are not limited to those of this example.

Examples of Positional Relationship of Sensors and Marks when Sheet is Set

Figure 5:
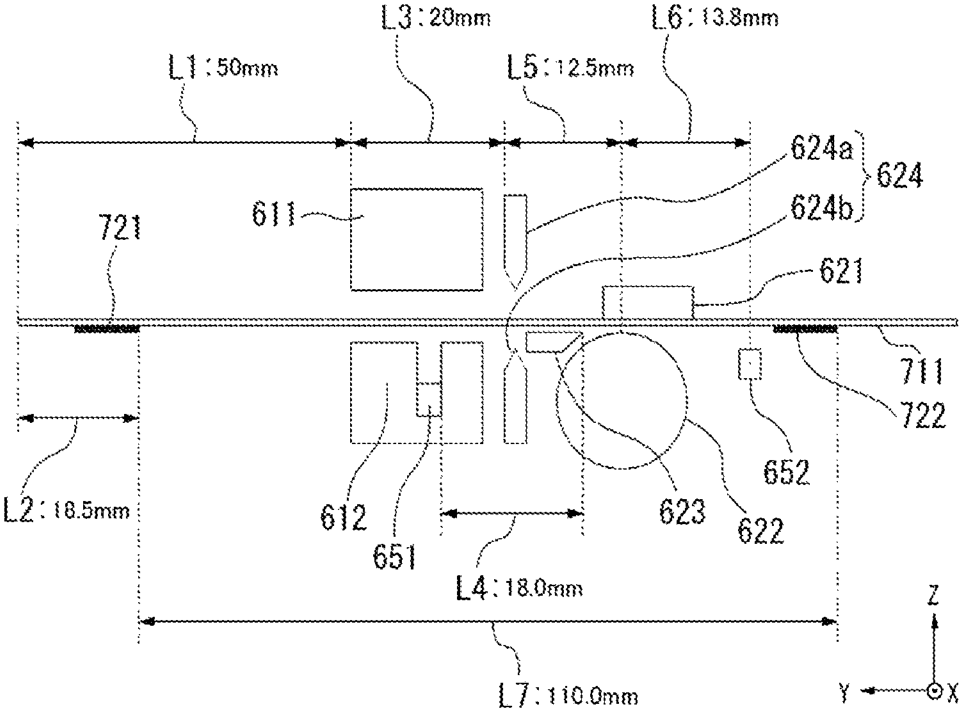
FIG. 5 is a view for illustrating an example of a positional relationship of marks and sensors when a sheet is set in the at least one embodiment.
Figure 6:
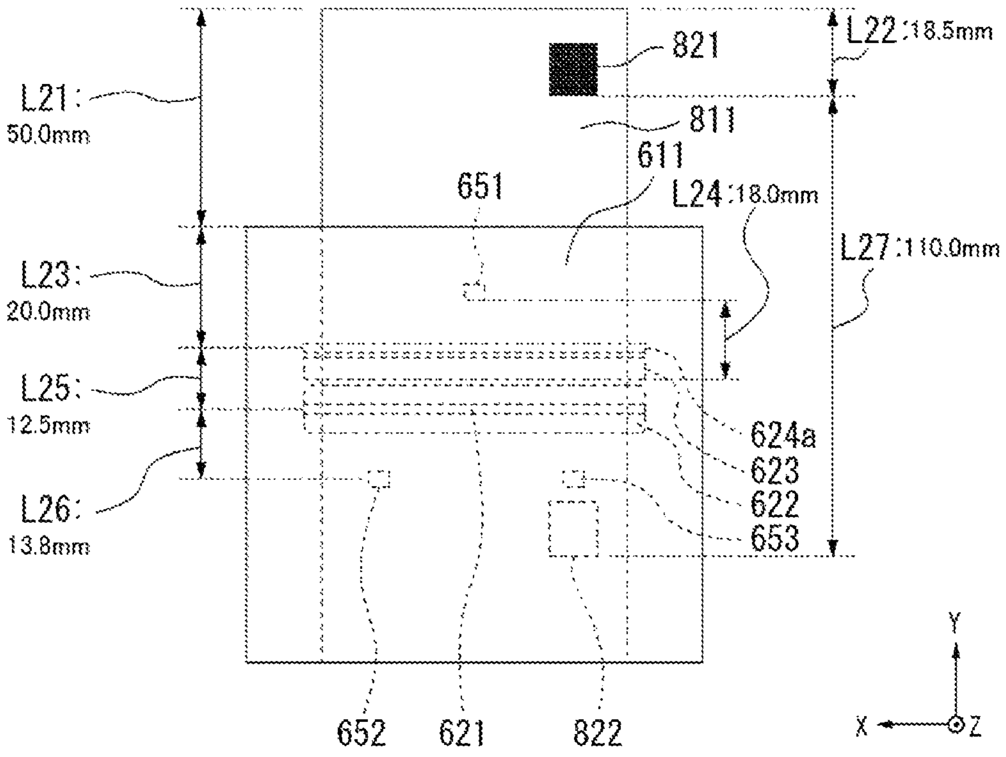
FIG. 6 is a view for illustrating an example of a positional relationship of sensors and marks when a label sheet with a liner is set in the at least one embodiment.
Figure 7:
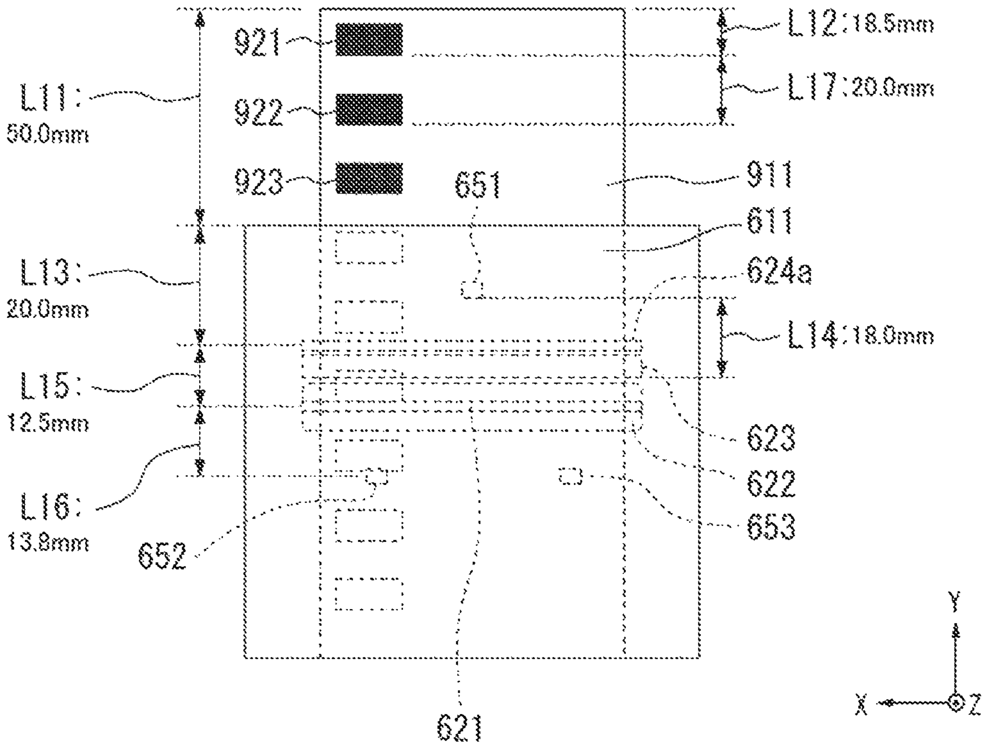
FIG. 7 is a view for illustrating an example of a positional relationship of sensors and marks when a label sheet without a liner is set in the at least one embodiment.

With reference to FIG. 5 to FIG. 7, description is made of examples of a positional relationship of sensors and marks when a sheet is set. In the examples of FIG. 5 to FIG. 7, description is made of a case in which a label sheet having a mark interval (label length) of 110 mm is used.

In each of FIG. 5 to FIG. 7, for convenience of description, an XYZ orthogonal coordinate system, which is a three-dimensional orthogonal coordinate system, is shown. In the examples of FIG. 5 to FIG. 7, a positive direction of a Y-axis corresponds to a forward direction of the thermal printer, and a negative direction of the Y-axis corresponds to a rearward direction of the thermal printer. A direction parallel to an X-axis corresponds to a lateral direction that is orthogonal to a front-and-rear direction of the thermal printer. A positive direction of a Z-axis corresponds to an upward direction, and a negative direction of the Z axis corresponds to a downward direction.

FIG. 5 is a view for illustrating an example of a positional relationship of sensors and marks when a sheet is set in the at least one embodiment. In the example of FIG. 5, there is shown a state of a cross section of the thermal printer as viewed in a line of sight from a positive side toward a negative side of the X-axis. The configuration example of the thermal printer illustrated in FIG. 5 is a specific example of the thermal printer 12 illustrated in FIG. 1 and FIG. 2.

In FIG. 5, as components of the thermal printer, there are illustrated a housing upper part 611, a housing lower part 612, a thermal head 621, a platen 622, a sheet guide 623, a cutter unit 624 formed of a cutter blade 624a in an upper part and a cutter blade 624b in a lower part, a taken-state detection sensor 651 corresponding to a first sensor unit, and a mark sensor 652 corresponding to a second sensor unit. Further, in FIG. 5, there are shown a sheet 711 set in the thermal printer and marks 721 and 722 provided on the sheet 711.

The housing upper part 611 serves as a cover. The cutter blade 624a in the upper part and the thermal head 621 are mounted to the housing upper part 611. Further, the platen 622, the sheet guide 623, the cutter blade 624b in the lower part, the taken-state detection sensor 651, and the mark sensor 652 are mounted to the housing lower part 612.

Description is made of an example of dimensions shown in FIG. 5. A distance L1 between a leading edge of the sheet 711 and a discharge port of the thermal printer is 50.0 mm. A distance L2 between the leading edge of the sheet 711 and a lower end of the mark 721 is 18.5 mm. A distance L3 between the discharge port of the thermal printer and each of the cutter blades 624a and 624b is 20.0 mm. A distance L4 between a lower end (upstream end) of the taken-state detection sensor 651 and a lower end (upstream end) of the sheet guide 623 is 18.0 mm. When the leading edge of the sheet 711 is fed back beyond the distance L4, the sheet 711 is caught by the platen 622, resulting in a conveyance error. A distance L5 between each of the cutter blades 624a and 624b and the thermal head 621 is 12.5 mm. A distance L6 between the thermal head 621 and the mark sensor 652 is 13.8 mm. A distance L7 of a mark interval (label length) is 110.0 mm.

As a mode of setting the sheet 711, for example, a range of 50 mm±10 mm from the discharge port of the thermal printer is optimum. This is because there is a possibility that, when the sheet 711 is set at an inner part with respect to the discharge port, the roll of the sheet 711 retreats to cause removal of the sheet 711 from the platen 622. A range of an upper limit and a lower limit that maximally exerts the effect of the at least one embodiment that detection of a mark can be quickly performed is, for example, an upper limit of 60 mm (it takes 3 seconds) and a lower limit of 40 mm (it takes 2 seconds) from the optimum distance. A distance by which the sheet 711 is to be returned at the time of returning the sheet 711 (in particular, when a receipt sheet is set) can be determined, for example, by returning the sheet 711 to the lower end (upstream end) of the taken-state detection sensor 651 and then returning the sheet 711 by 18 mm.

The taken-state detection sensor 651 is arranged at a position that prevents erroneous detection caused by disturbance light. The mark sensor 652 is arranged at a position that avoids interference with the platen 622.

FIG. 6 is a view for illustrating an example of a positional relationship of sensors and marks when a label sheet 811 with a liner is set in the at least one embodiment. The label sheet 811 with a liner is a specific example of the label sheet 501 with a liner illustrated in FIG. 4.

In the example of FIG. 6, there is shown a state of the thermal printer as viewed in a line of sight from a positive side toward a negative side of the Z-axis (in a line of sight from above toward below). In FIG. 6, there is also illustrated a mark sensor 653 corresponding to a third sensor unit, which overlaps the mark sensor 652 and cannot be seen in the example of FIG. 5.

In FIG. 6, illustration is given of a case in which the label sheet 811 with a liner is used as an example of the sheet 711 illustrated in FIG. 5. In FIG. 6, there are illustrated the label sheet 811 with a liner set in the thermal printer and marks 821 and 822 provided on the label sheet 811 with a liner.

Description is made of an example of dimensions shown in FIG. 6. A distance L21 between a leading edge of the label sheet 811 with a liner and the discharge port of the thermal printer is 50.0 mm. A distance L22 between the leading edge of the label sheet 811 with a liner and a lower end of the mark 821 is 18.5 mm. A distance L23 between the discharge port of the thermal printer and each of the cutter blades 624*a* and 624*b* is 20.0 mm. A distance L24 between the lower end (upstream end) of the taken-state detection sensor 651 and the lower end (upstream end) of the sheet guide 623 is 18.0 mm. A distance L25 between each of the cutter blades 624*a* and 624*b* and the thermal head 621 is 12.5 mm. A distance L26 between the thermal head 621 and each of the mark sensors 652 and 653 is 13.8 mm. A distance L27 of a mark interval (label length) is 110.0 mm.

FIG. 7 is a view for illustrating an example of a positional relationship of sensors and marks when a label sheet 911 without a liner is set in the at least one embodiment. The label sheet 911 without a liner is a specific example of the label sheet 401 without a liner illustrated in FIG. 3.

In the example of FIG. 7, there is shown a state of the thermal printer as viewed in the line of sight from the positive side toward the negative side of the Z-axis (in the line of sight from above toward below). In FIG. 7, there is also illustrated the mark sensor 653 corresponding to the third sensor unit, which overlaps the mark sensor 652 and cannot be seen in the example of FIG. 5.

In FIG. 7, illustration is given of a case in which the label sheet 911 without a liner is used as an example of the sheet 711 illustrated in FIG. 5. In FIG. 7, there are illustrated the label sheet 911 without a liner set in the thermal printer and marks 921 to 923 provided on the label sheet 911 without a liner. In the example of FIG. 7, the illustration is simplified, and only the marks 921 to 923 of the plurality of marks are denoted by reference symbols.

Description is made of an example of dimensions shown in FIG. 7. A distance L11 between a leading edge of the label sheet 911 without a liner and the discharge port of the thermal printer is 50.0 mm. A distance L12 between the leading edge of the label sheet 911 without a liner and a lower end of the mark 921 is 18.0 mm. A distance L13 between the discharge port of the thermal printer and each of the cutter blades 624*a* and 624*b* is 20.0 mm. A distance L14 between the lower end (upstream end) of the taken-state detection sensor 651 and the lower end (upstream end) of the sheet guide 623 is 18.0 mm. A distance L15 between each of the cutter blades 624*a* and 624*b* and the thermal head 621 is 12.5 mm. A distance L16 between the thermal head 621 and the mark sensor 652 is 13.8 mm. A distance L17 of a mark interval (label length) is 20.0 mm.

Example of Operations in Thermal Printer

Figure 8A:
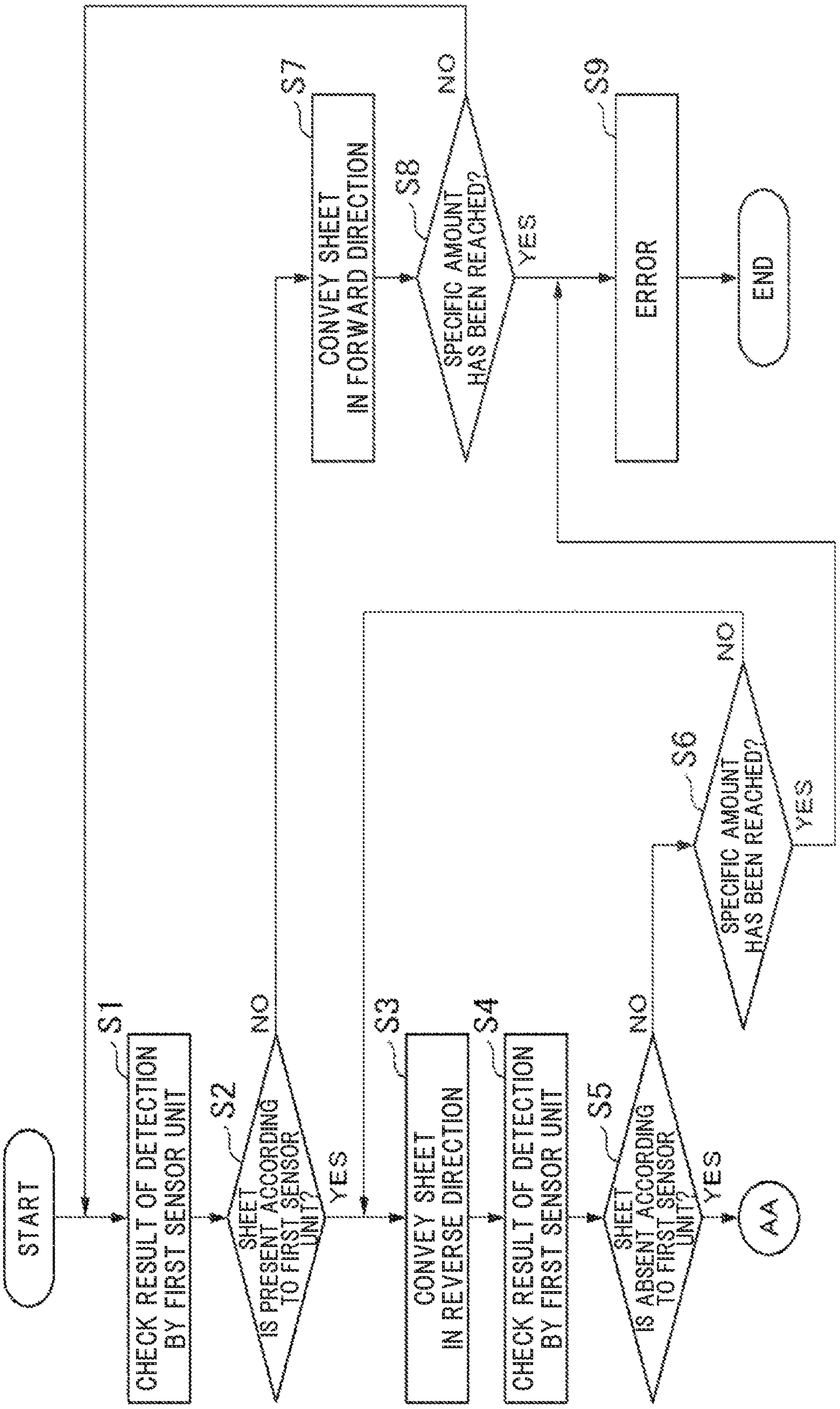
FIG. 8A is a flowchart for illustrating an example of a procedure of processing to be performed in the thermal printer according to the at least one embodiment.
Figure 8B:
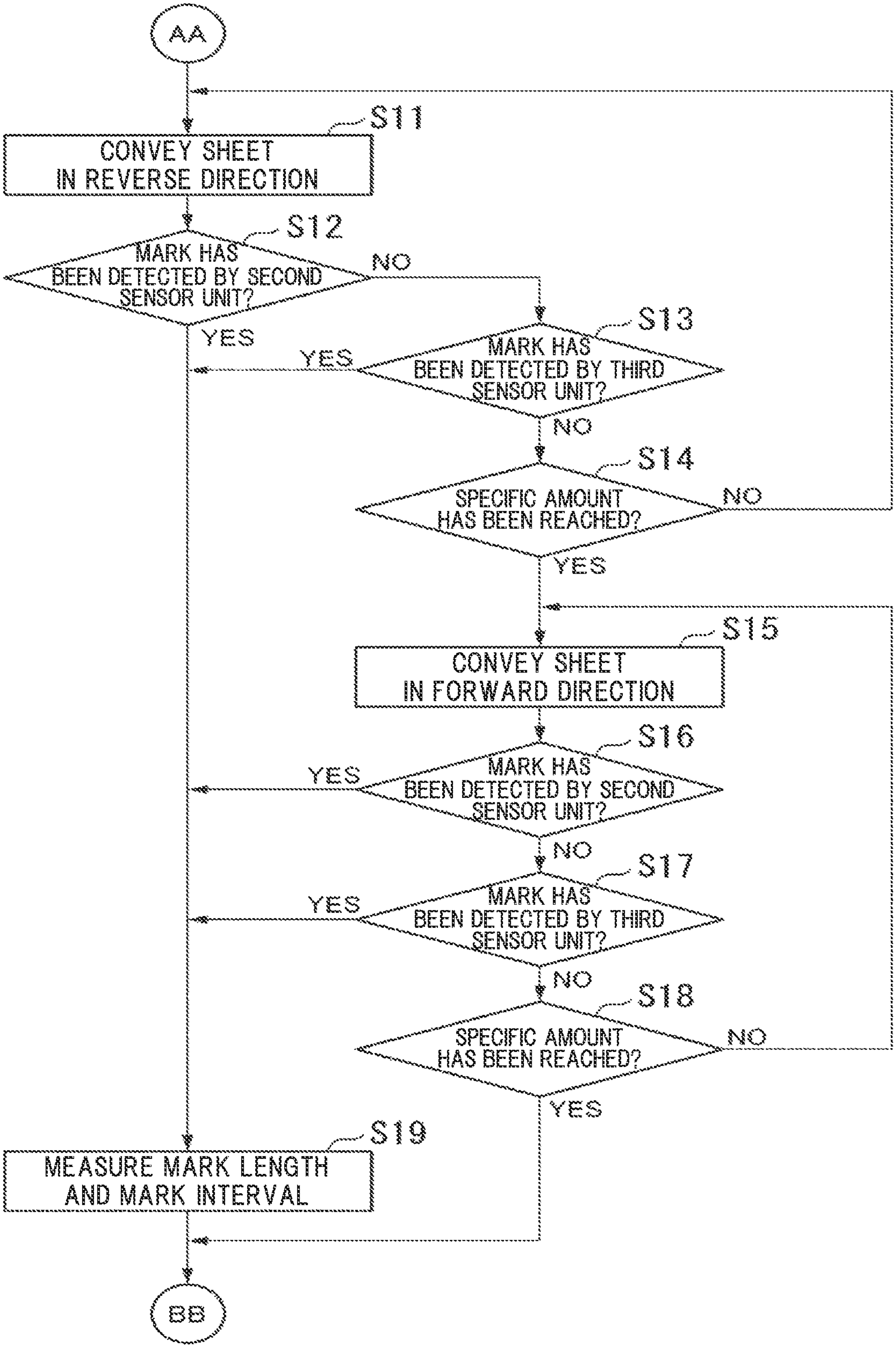
FIG. 8B is a flowchart for illustrating the example of the procedure of the processing to be performed in the thermal printer according to the at least one embodiment.
Figure 8C:
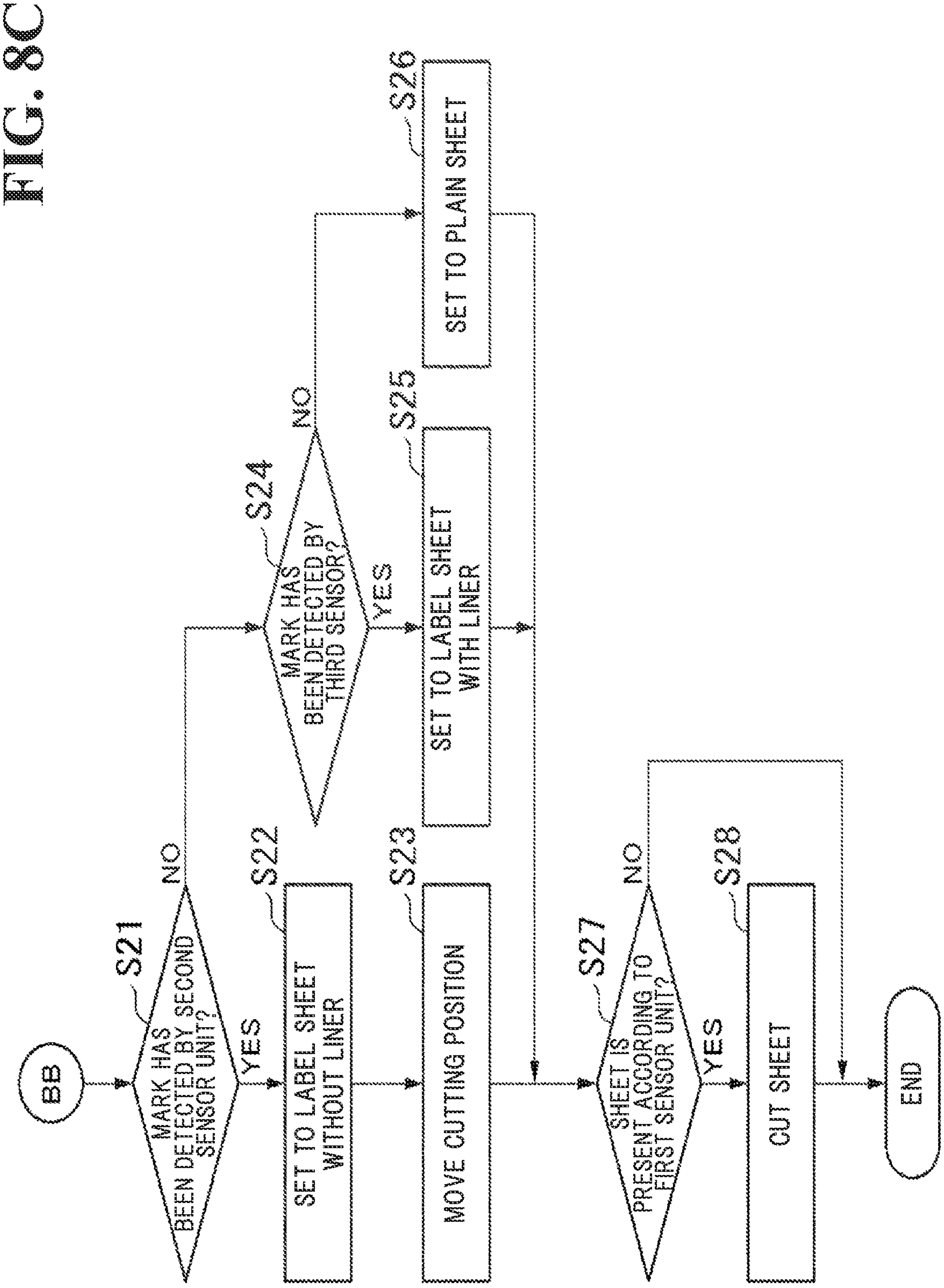
FIG. 8C is a flowchart for illustrating the example of the procedure of the processing to be performed in the thermal printer according to the at least one embodiment.

FIG. 8A, FIG. 8B, and FIG. 8C are flowcharts for illustrating an example of a procedure of processing to be performed in the thermal printer 12 according to the at least one embodiment. The processing flow illustrated in FIG. 8A, FIG. 8B, and FIG. 8C is shown in three separate parts for convenience of illustration, but is a series of processing flows in the at least one embodiment. In this flow, illustration is given of an example of sheet automatic detection processing performed in the thermal printer 12. In this flow, an example of operations is illustrated with the functional units illustrated in FIG. 2 as an example. In the at least one embodiment, a direction of outputting a sheet to the outside of the thermal printer 12 (direction of discharging a roll sheet) is referred to as a forward direction, and a direction of returning the sheet into the thermal printer 12 (direction of winding back the roll sheet) is referred to as a reverse direction.

This flow is performed at a predetermined timing in the thermal printer 12. The predetermined timing is, for example, a timing at which a sheet is set in the thermal printer 12 and a cover (housing upper part 111*a*) is closed. In this case, the fact that the cover has been closed can be detected by the cover-open detection circuit 236. Further, as the predetermined timing, there may be used one or both of, for example, a timing at which a power supply button of the thermal printer 12 is operated so that the power supply is switched from OFF to ON and a timing at which the thermal printer 12 receives the reset. The reset may be received by, for example, pressing the power supply button for a long time.

First, a user sets a sheet in the thermal printer 12 by a drop-in method. In the at least one embodiment, the sheet is any one of a plain sheet, a label sheet without a liner, and a label sheet with a liner. Further, a plurality of kinds of label sheets without a liner may be used, or alternatively, a plurality of kinds of label sheets with a liner may be used. In the at least one embodiment, for example, the sheet is set such that the leading edge of the sheet is located roughly within 50 mm from the sheet discharge port 131.

(Step S1) The CPU 251 checks a result of detection by the taken-state detection circuit 238 corresponding to the first sensor unit. Then, the process proceeds to Step S2.

(Step S2) The CPU 251 determines the presence or absence of a sheet (whether the sheet is present) set in the thermal printer 12 with use of the taken-state detection circuit 238 corresponding to the first sensor unit. As a result of the determination, when the CPU 251 has determined that the sheet is present (YES in Step S2), the process proceeds to Step S3. Meanwhile, as a result of the determination, when the CPU 251 has determined that the sheet is absent (NO in Step S2), the process proceeds to Step S7. In the at least one embodiment, this case corresponds to a case in which the sheet is set such that the leading edge of the sheet is located on a far side (inner side of the thermal printer 12) with respect to a detection position of the taken-state detection circuit 238.

(Step S3) The CPU 251 causes the sheet to be conveyed in the reverse direction. Then, the process proceeds to Step S4.

(Step S4) The CPU 251 checks a result of detection by the taken-state detection circuit 238 corresponding to the first sensor unit. Then, the process proceeds to Step S5.

(Step S5) The CPU 251 determines the presence or absence of the sheet (whether the sheet is absent) set in the thermal printer 12 with use of the taken-state detection circuit 238 corresponding to the first sensor unit. As a result of the determination, when the CPU 251 has determined that the sheet is present (NO in Step S5), the process proceeds to Step S6. Meanwhile, as a result of the determination, when the CPU 251 has determined that the sheet is absent (YES in Step S5), the process proceeds to Step S11.

(Step S6) The CPU 251 determines whether or not a conveyance amount of the sheet in the reverse direction has reached a predetermined specific amount. As a result of the determination, when the CPU 251 has determined that the conveyance amount of the sheet in the reverse direction has reached the predetermined specific amount (YES in Step S6), the process proceeds to Step S9. Meanwhile, as a result of the determination, when the CPU 251 has determined that the conveyance amount of the sheet in the reverse direction has not reached the predetermined specific amount (NO in Step S6), the process proceeds to Step S3.

(Step S7) The CPU 251 causes the sheet to be conveyed in the forward direction. Then, the process proceeds to Step S8.

(Step S8) The CPU 251 determines whether or not the amount of conveyance of the sheet in the forward direction has reached a predetermined specific amount. As a result of the determination, when the CPU 251 has determined that the amount of conveyance of the sheet in the forward direction has reached the predetermined specific amount (YES in Step S8), the process proceeds to Step S9. Meanwhile, as a result of the determination, when the CPU 251 has determined that the amount of conveyance of the sheet in the forward direction has not reached the predetermined specific amount (NO in Step S8), the process proceeds to Step S1.

(Step S9) The CPU 251 determines that an error is present. The CPU 251 then terminates the processing of this flow.

Step S11) The CPU 251 causes the sheet to be conveyed in the reverse direction. Then, the process proceeds to Step S12.

(Step S12) The CPU 251 determines whether or not a mark of the sheet has been detected by the mark detection circuit 239 corresponding to the second sensor unit. As a result of the determination, when the CPU 251 has determined that the mark of the sheet has been detected (YES in Step S12), the process proceeds to Step S19. Meanwhile, as a result of the determination, when the CPU 251 has determined that the mark of the sheet has not been detected (NO in Step S12), the process proceeds to Step S13.

(Step S13) The CPU 251 determines whether or not a mark of the sheet has been detected by the sheet/mark detection circuit 237 corresponding to the third sensor unit. As a result of the determination, when the CPU 251 has determined that the mark of the sheet has been detected (YES in Step S13), the process proceeds to Step S19. Meanwhile, as a result of the determination, when it is determined that the mark of the sheet has not been detected (NO in Step S13), the process proceeds to Step S14.

(Step S14) The CPU 251 determines whether or not the amount of conveyance of the sheet in the reverse direction has reached the predetermined specific amount.

As a result of the determination, when the CPU 251 has determined that the amount of conveyance of the sheet in the reverse direction has reached the predetermined specific amount (YES in Step S14), the process proceeds to Step S15. Meanwhile, as a result of the determination, when the CPU 251 has determined that the amount of conveyance of the sheet in the reverse direction has not reached the predetermined specific amount (NO in Step S14), the process proceeds to Step S11.

(Step S15) The CPU 251 causes the sheet to be conveyed in the forward direction. Then, the process proceeds to Step S16.

(Step S16) The CPU 251 determines whether or not a mark of the sheet has been detected by the mark detection circuit 239 corresponding to the second sensor unit. As a result of the determination, when the CPU 251 has determined that the mark of the sheet has been detected (YES in Step S16), the process proceeds to Step S19. Meanwhile, as a result of the determination, when the CPU 251 has determined that the mark of the sheet has not been detected (NO in Step S16), the process proceeds to Step S17.

(Step S17) The CPU 251 determines whether or not a mark of the sheet has been detected by the sheet/mark detection circuit 237 corresponding to the third sensor unit. As a result of the determination, when the CPU 251 has determined that the mark of the sheet has been detected (YES in Step S17), the process proceeds to Step S19. Meanwhile, as a result of the determination, when the CPU 251 has determined that the mark of the sheet has not been detected (NO in Step S17), the process proceeds to Step S18.

(Step S18) The CPU 251 determines whether or not the amount of conveyance of the sheet in the forward direction has reached the predetermined specific amount. As a result of the determination, when the CPU 251 has determined that the amount of conveyance of the sheet in the forward direction has reached the predetermined specific amount (YES in Step S18), the process proceeds to Step S21. Meanwhile, as a result of the determination, when the CPU 251 has determined that the amount of conveyance of the sheet in the forward direction has not reached the predetermined specific amount (NO in Step S18), the process proceeds to Step S15.

(Step S19) The CPU 251 measures (detects) a length of the mark and an interval of the marks for the marks that have been detected by the second sensor unit or the third sensor unit. Then, the process proceeds to Step S21.

(Step S21) The CPU 251 determines whether or not there is given a result that the mark of the sheet has been detected by the mark detection circuit 239 corresponding to the second sensor unit. As a result of the determination, when the CPU 251 has determined that there is given the result that the mark of the sheet has been detected (YES in Step S21), the process proceeds to Step S22. Meanwhile, as a result of the determination, when the CPU 251 has determined that there is given a result that the mark of the sheet has not been detected (NO in Step S21), the process proceeds to Step S24.

(Step S22) The CPU 251 determines that the sheet is a label sheet without a liner. Then, the process proceeds to Step S23.

(Step S23) The CPU 251 moves a cutting position so as to be adapted to the label sheet without a liner. Then, the process proceeds to Step S27.

(Step S24) The CPU 251 determines whether or not there is given a result that the mark of the sheet has been detected by the sheet/mark detection circuit 237 corresponding to the third sensor unit. As a result of the determination, when the CPU 251 has determined that there is given the result that the mark of the sheet has been detected (YES in Step S24), the process proceeds to Step S25. Meanwhile, as a result of the determination, when the CPU 251 has determined that there is given a result that the mark of the sheet has not been detected (NO in Step S24), the process proceeds to Step S26.

(Step S25) The CPU 251 determines that the sheet is a label sheet with a liner. Then, the process proceeds to Step S27.

(Step S26) The CPU 251 determines that the sheet is a plain sheet. Then, the process proceeds to Step S27.

(Step S27) The CPU 251 determines the presence or absence of the sheet (whether the sheet is present) with use of the taken-state detection circuit 238 corresponding to the first sensor unit. As a result of the determination, when the CPU 251 has determined that the sheet is present (YES in Step S27), the process proceeds to Step S28. Meanwhile, as a result of the determination, when the CPU 251 has determined that the sheet is absent (NO in Step S27), the CPU 251 terminates the processing of this flow.

In this example, in the processing step of Step S27, the presence or absence of the sheet at the position of the cutter unit 624 (or a position in the periphery thereof) is determined. Further, in this example, when it is determined that the sheet is absent, the operation of cutting can be omitted, thereby improving the efficiency. For example, there may be given such settings that the cutting is not performed in the case of a label sheet without a liner or a label sheet with a liner and the cutting is performed in the case of a plain sheet.

(Step S28) The CPU 251 causes the sheet to be cut. The CPU 251 then terminates the processing of this flow.

When the cutting for each sheet is to be performed, for example, before the cutting, operations of setting a distance by which each sheet is moved to the cutting position, setting a distance by which each sheet is moved to the printing start position, and setting energy (in the at least one embodiment, energization time that enables variation in density of printing) are performed. In the thermal printer 12, when the printing is to be performed, for example, a mark search command is issued, and the printing is started from a location corresponding to the operation by a printing-start-position moving distance that has been automatically set, thereby being capable performing printing without wasting an upper margin.

As described above, the thermal printer 12 according to the at least one embodiment has a printer structure employing a drop-in method. In the thermal printer 12, the presence or absence of a sheet is determined with use of the first sensor unit after the top cover has been set, and, depending on the determination, the sheet is conveyed in the forward direction or the reverse direction. After that, in the thermal printer 12, the mark is detected with use of the second sensor unit and the third sensor unit, and the sheet is automatically detected based on the mark length and the mark interval. Then, in the thermal printer 12, after the sheet has been automatically detected, for example, a cutting position moving distance, the printing-start-position moving distance, and the energy settings of the sheet are changed, and the sheet is moved to the cutting position. At this time, in the thermal printer 12, the presence or absence of the sheet is determined with use of the first sensor unit. When the sheet is absent, the cutting is not performed. When the sheet is present, the cutting is performed. After that, the operation is terminated.

In this example, illustration is given of the case in which the length of the mark and the interval of the marks are detected in the processing step of Step S19, thereby being capable of, for example, differentiating (distinguishing) a plurality of kinds of label sheets without a liner or differentiating (distinguishing) a plurality of kinds of label sheets with a liner. As another example, when a plain sheet, one kind of a label sheet without a liner, and one kind of a label sheet with a liner are used, the processing step of Step S19 may be omitted, and differentiation (distinguishing) of those sheets can be performed.

As described above, in the printing system 1 in the at least one embodiment, in the thermal printer 12, the processing of determining a kind of a sheet that has been set can be implemented in a short period of time. In the at least one embodiment, for example, with a leading edge of a sheet being set by a user within a predetermined distance (for example, 50 mm) from the sheet discharge port 131, as compared to the related art which requires time for the operation of moving the sheet back and forth, for example, the time for automatically distinguishing a sheet can be shortened significantly.

Further, in the related art, there has been given a configuration in which the presence or absence of a sheet and a mark are detected with use of one sensor unit. Thus, kinds of sheets that can be determined are limited to two kinds (a plain sheet and a label sheet). In contrast, according to the at least one embodiment, with use of three sensor units, at least three kinds of sheets (a plain sheet, a label sheet without a liner, and a label sheet with a liner) can be determined.

Further, as another configuration example, in the thermal printer 12 according to the at least one embodiment, there may be implemented a configuration in which only one of the second sensor unit and the third sensor unit is used for distinguishing of a sheet. In this case, kinds of sheets that can be determined may be two kinds (a plain sheet and a label sheet), but there can be obtained an effect that the time for automatically distinguishing a sheet can be shortened significantly.

For example, the thermal printer 12 includes the first sensor unit 151 that detects the presence or absence of a sheet, the second sensor unit 152 that detects information related to a mark provided on the sheet, and the sheet determination unit (for example, CPU 251) that determines a kind of the sheet. The sheet determination unit determines a kind of a sheet based on a result of detecting information related to a mark with use of the second sensor unit 152 after the sheet is conveyed in the reverse direction with respect to the direction of discharging the sheet.

For example, the thermal printer 12 has a structure for setting a sheet by a drop-in method. For example, the thermal printer 12 includes the cutter unit 624 that cuts a sheet. The first sensor unit 151 detects the presence or absence of the sheet at the position of the cutter unit 624 or at a position in a periphery thereof. The cutter unit 624 performs the operation of cutting a sheet when the sheet is present. The cutter unit 624 does not perform the operation of cutting a sheet when the sheet is absent.

For example, the thermal printer 12 detects the presence or absence of a mark, a length of the mark, and an interval of marks with use of the second sensor unit 152. A mode of detecting only one of a length of a mark and an interval of marks may be used, or a mode of detecting both may be used.

For example, in the thermal printer 12, two or more of a plain sheet having no mark provided thereon, a label sheet without a liner having a mark provided thereon, and a label sheet with a liner having a mark provided thereon are used as the sheet.

For example, the thermal printer 12 further includes the third sensor unit 153 that detects information related to a mark provided on a sheet. The second sensor unit 152 and the third sensor unit 153 detect respective pieces of information related to marks arranged at different positions on the sheet.

For example, in the thermal printer 12, a plain sheet having no mark provided thereon, a label sheet without a liner having a mark provided thereon, and a label sheet with a liner having a mark provided thereon are used as the sheet.

A program for implementing the function of any component of any device described above may be recorded in a computer-readable recording medium so that the program is read by a computer system to be executed. The “computer system” here includes an operating system or hardware including peripheral devices. Further, the “computer-readable recording medium” is a portable medium such as a flexible disk, a magneto-optical disk, a ROM, or a compact disc read-only memory (CD-ROM), or a storage device built in the computer system, such as a hard disk drive. The term “computer-readable recording medium” also includes a medium which holds a program for a fixed period of time, for example, a volatile memory included in a computer system serving as a server or a client in a case in which a program is transmitted via a network such as the Internet, or a communication line such as a telephone line. The volatile memory may be, for example, a random access memory (RAM). The recording medium may be, for example, a non-transitory recording medium.

The above-mentioned program may be transmitted from the computer system in which the program is stored in, for example, the storage device, to another computer system via a transmission medium or through a transmission wave in a transmission medium. The "transmission medium" here through which a program is transmitted refers to a medium having a function of transmitting information, for example, a network such as the Internet or a communication line such as a telephone line.

Further, the above-mentioned program may be intended to implement some of the functions described above. Further, the above-mentioned program may be a program which enables the functions described above to be implemented when being combined with a program that is already recorded in the computer system, which is what is called "differential file." The differential file may also be referred to as "differential program."

The function of any component of any device described above may be implemented by a processor. For example, each procedure of processing in the at least one embodiment may be implemented by a processor which operates based on information such as a program and a computer-readable recording medium having stored thereon the information such as a program. For example, functions of respective parts of the processor may be implemented by individual pieces of hardware, or the functions of the respective parts may be implemented by integrated hardware. For example, the processor includes hardware, and the hardware may include at least one of a circuit which processes a digital signal or a circuit which processes an analog signal. For example, the processor may be formed through use of one or both of one or a plurality of circuit devices mounted on a circuit board, and one or a plurality of circuit elements mounted thereon. An integrated circuit (IC) or the like may be used as the circuit device(s), and a resistor, a capacitor, or the like may be used as the circuit element(s).

The processor may be, for example, a CPU. It should be noted, however, that the processor is not limited to a CPU, and for example, one of various types of processors such as a graphics processing unit (GPU) and a digital signal processor (DSP) may be used as the processor. The processor may also be, for example, a hardware circuit implemented by an application-specific integrated circuit (ASIC). The processor may be formed of, for example, a plurality of CPUs, or may be formed of a hardware circuit implemented by a plurality of ASICs. The processor may also be formed of, for example, a combination of a plurality of CPUs and a hardware circuit implemented by a plurality of ASICs. The processor may also include, for example, one or more of an amplifier circuit which processes an analog signal, a filter circuit, and the like.

In the above, the at least one embodiment of the present disclosure has been described in detail with reference to the drawings, but specific configurations are not limited to those of the at least one embodiment and encompass a change in design and the like without departing from the gist of the present disclosure.

What is claimed is:

1. A portable terminal having a thermal head, comprising:
- a first sensor unit configured to detect presence or absence of a sheet;
- a second sensor unit configured to detect information related to a mark provided on the sheet; and
- a sheet determination unit configured to determine a kind of the sheet,
- wherein the sheet determination unit is configured to determine a kind of the sheet based on a result of detecting information related to the mark with use of the second sensor unit after the sheet is conveyed in a reverse direction with respect to a direction of discharging the sheet.

2. The portable terminal according to claim 1, wherein the portable terminal has a structure for setting the sheet by a drop-in method.

3. The portable terminal according to claim 1, further comprising a cutter unit configured to cut the sheet,
- wherein the first sensor unit is configured to detect the presence or absence of the sheet at one of a position of the cutter unit or a position in a periphery thereof, and
- wherein the cutter unit is configured to perform an operation of cutting the sheet when the sheet is present, and is configured to avoid performing the operation of cutting the sheet when the sheet is absent.

4. The portable terminal according to claim 1, wherein the presence or absence of the mark, a length of the mark, and an interval of the mark are detected with use of the second sensor unit.

5. The portable terminal according to claim 1, wherein two or more of a plain sheet having no mark provided thereon, a label sheet without a liner having the mark provided thereon, and a label sheet with a liner having the mark provided thereon are used as the sheet.

6. The portable terminal according to claim 1, further comprising a third sensor unit configured to detect information related to the mark provided on the sheet,
- wherein the second sensor unit and the third sensor unit are configured to detect respective pieces of information related to the marks arranged at different positions on the sheet.

7. The portable terminal according to claim 6, wherein a plain sheet having no mark provided thereon, a label sheet without a liner having the mark provided thereon, and a label sheet with a liner having the mark provided thereon are used as the sheet.

8. A printing control method to be performed in a portable terminal having a thermal head, the printing control method comprising:
- detecting, by a first sensor unit, presence or absence of a sheet;
- detecting, by a second sensor unit, information related to a mark provided on the sheet; and
- determining, by a sheet determination unit, a kind of the sheet based on a result of detecting information related to the mark with use of the second sensor unit after the sheet is conveyed in a reverse direction with respect to a direction of discharging the sheet.

9. A non-transitory computer readable storage medium that stores a program for causing a non-transitory computer readable storage medium forming a portable terminal having a thermal head to implement the functions of:
- detecting presence or absence of a sheet based on a result of detection by a first sensor unit;
- detecting information related to a mark provided on the sheet based on a result of detection by a second sensor unit; and
- determining a kind of the sheet based on a result of detecting information related to the mark with use of the second sensor unit after the sheet is conveyed in a reverse direction with respect to a direction of discharging the sheet.

* * * * *